US006922144B2

United States Patent
Bulin et al.

(10) Patent No.: US 6,922,144 B2
(45) Date of Patent: Jul. 26, 2005

(54) MONITORING SYSTEM FOR A MOBILE STORAGE TANK

(75) Inventors: Tom Bulin, Clafin, KS (US); Tom Gallagher, Orchard Park, NY (US); Scott E. Gray, Wilson, KS (US); Gerard W. Langton, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 93 days.

(21) Appl. No.: 10/686,662

(22) Filed: Oct. 17, 2003

(65) Prior Publication Data

US 2005/0083198 A1 Apr. 21, 2005

(51) Int. Cl.[7] ................................................. G08B 1/08
(52) U.S. Cl. .................. 340/539.22; 340/603; 340/612; 340/613; 340/614; 340/618
(58) Field of Search .......................... 340/539.1, 539.22, 340/539.26, 603, 612–614, 618, 438, 439, 825.36, 825.49

(56) References Cited

U.S. PATENT DOCUMENTS 5,128,559 A * 7/1992 Steele .......................... 326/38
5,953,682 A * 9/1999 McCarrick et al. ............ 702/45
6,422,061 B1 * 7/2002 Sunshine et al. .......... 73/29.01
6,837,095 B2 * 1/2005 Sunshine et al. ............ 73/23.2
2004/0041709 A1 * 3/2004 Forster ....................... 340/603

* cited by examiner

Primary Examiner—Jeffrey Hofsass
Assistant Examiner—George A. Bugg
(74) Attorney, Agent, or Firm—David M. Rosenblum

(57) ABSTRACT

A remote monitoring system for a mobile storage tank having a product container in which a remote telemetry unit gathers liquid level and head space pressure data and global position data. The remote telemetry unit effects a wireless transmission of a standard message structure containing the pressure and level data and the global position data. In addition, in case of a storage tank having a thermal shield fluid, pressure and level data for the shield fluid itself may also be in the standard data record as well as acceleration data from an accelerometer to indicate tank damage. If upset conditions of pressure and liquid level are reached in the thermal shield and/or product container, vapor may be vented in accordance with preset programming in order to attempt to reestablish liquid level and vapor pressure above set points.

11 Claims, 2 Drawing Sheets

MONITORING SYSTEM FOR A MOBILE STORAGE TANK

FIELD OF THE INVENTION

The present invention relates to a remote monitoring system for a mobile storage tank in which a liquefied gas is stored within a product container at cryogenic temperatures. More particularly, the present invention relates to such a system in which data records of liquid level and vapor pressure within the product container along with global position data derived from a global positioning system are stored in and subsequently transmitted from a remote telemetry unit to a receiving station.

BACKGROUND OF THE INVENTION

Liquefied gases, such as liquid nitrogen, liquid oxygen, helium, hydrogen and etc., are stored at cryogenic temperatures within mobile storage tanks for shipment to customers. Such mobile storage tanks are incorporated into truck drawn trailers, rail cars, and sea going tanks.

Although such mobile storage tanks are heavily insulated and contain layers of vacuum insulation, heat leakage by radiant heat transfer causes vaporization of the liquefied gas during shipment. The warm vaporized gas is vented and thereby results in product loss. In order to minimize product loss through vaporization, certain mobile storage tanks used for the transport of value added products such as helium can have thermal shields that are designed to minimize product loss through such vaporization. The thermal shield is a conductive metal sheet that overlies the top of the product container and is located in a surrounding vacuum insulation layer. A shield fluid tank containing a cryogenic shield fluid, such as nitrogen in case of helium, is connected by piping to the thermal shield. Radiant heat energy that would otherwise pass to the product container holding the product is intercepted to inhibit the radiant heat transfer to the container. There are three types of shields: a single shield with a single shield fluid or gas; a single shield with two shield fluids or gases; two shields, each shield having a different single fluid or gas.

During long journeys, the shield fluid or gas is vented through the thermal shield to allow liquid thermal shield fluid or gas to enter piping of the thermal shield. The liquid or cold gas that replaces the warm gas will eventually be vaporized and further replaced. As the time of transit increases, the product is also vented. In this regard, in mobile storage tanks designed for helium transport, a helium thermal shield is provided that underlies the nitrogen thermal shield.

The current practice to control product loss by venting is to control the venting by a pressure regulator or flow meter and sometimes a pipe orifice. Typically, the pressure regulator or flow meter is preset in accordance with a schedule that depends on the predicted length of transit. The settings of the pressure regulators or flow meters are not changed after departure because such setting has to be effected by trained personnel.

As may be appreciated, due to unforeseen delays, mobile storage containers sometimes arrive at their destinations with a high percentage of product loss or empty. For instance, during a lengthy ocean voyage, where the storage tank is in customs for too long a time, all the product may be lost. In case of helium, this can be a particularly expensive loss.

The monitoring of liquefied gas storage within storage tanks at fixed installations is a relatively straightforward proposition. In such storage tanks, liquid level is sensed, recorded and transmitted by a remote telemetry unit, which has either a cell phone wireless communication modem or a standard land line modem. The data is read at a central station for managing the particular storage tank. Low liquid level can be addressed by simply refilling the storage tank with an amount of liquid calculated to meet a customers needs.

The problem with implementing such a system with respect to a mobile storage tank is that by necessity, the mobile storage tank can only be provided with on-board battery and/or solar power. Thus, the use of a remote telemetry unit in the same manner as in a fixed installation is not practical. Additionally, even with the use of a remote telemetry unit, mere transmission of pressure, content level, and/or temperature data are not very useful if the location of the mobile storage tank is not known. For instance, the actions that could be taken by a gas supplier with respect to the mobile storage tank being shipped by oceanic transport would be different depending upon whether the tank were in the port and delayed in customs versus in transit and on the open sea.

As will be discussed, the present invention provides a remote monitoring system for a mobile storage tank that utilizes a remote telemetry unit in such a way that data is only periodically recorded and transmitted so that battery power may be conserved and that in preferred embodiments can exercise a control function to selectively vent heat fluid vapor and/or product vapor.

SUMMARY OF THE INVENTION

The present invention provides a remote monitoring system for a mobile storage tank having a product container for storing a liquefied gas at cryogenic temperatures.

In accordance with the present invention, a sensor system generates level signals referable to a liquid level of a liquid phase of the liquefied gas and pressure signals referable to vapor pressure of a vapor phase of the liquefied gas within the product container. In order to record the location at which the liquid level and pressure were measured, a global positioning system is connected to the mobile storage tank to generate global position signals referable to a global position of the mobile storage tank in global latitude and longitude coordinates. A remote telemetry unit is located on board the mobile storage tank and is responsive to the level signals, pressure signals and global position signals to store data records containing data referable to the liquid level and vapor pressure within said product container and the global latitude and longitude coordinates. The remote telemetry unit effects a wireless transmission of the data records and a unique remote telemetry unit identification in a standard message structure. The wireless transmission can be received by a ground unit to determine the status of the product being shipped within the mobile storage tank.

Preferably, the remote telemetry unit has a control program. The control program is programmed to periodically activate the sensor system and the global positioning system and to store a plurality of the data records at predefined time intervals. Additionally, the control program also activates the unit to effect the wireless transmission of the plurality of said data records after the storage thereof is complete. Each of said data records contains time data indicative of a particular time interval in which the remote telemetry unit, said global positioning unit and said sensor system were activated. As may be appreciated, such intermittent operation conserves limited on board power.

An accelerometer or multiple accelerometers can be provided to generate acceleration signals referable to a change in motion of the mobile storage tank. The remote telemetry unit is response to the acceleration signals and data records also comprise acceleration data referable to the change in motion of the mobile storage tank. The advantage of such a feature is that it allows remote operators to rapidly detect accidental handling that might lead to future failure of the mobile storage tank.

The level signals, pressure signals, and acceleration signals can be analog signals and the global position signals can be in a digital format. For such purposes, the remote telemetry unit further has an analog to digital converter to convert the level signals, pressure signals, and acceleration signals to the level data, the pressure data and the acceleration data.

The mobile storage tank can further have a cryogenic shield fluid contained within a shield fluid tank. In such case the sensor system associated with the storage container is a first sensor system. A second sensor system generates shield fluid level and shield fluid pressure signals referable to a cryogenic shield fluid liquid level and a shield fluid vapor pressure of said cryogenic shield fluid within the shield fluid tank. The remote telemetry unit is also responsive to said shield fluid level and shield fluid pressure signals and the data within said data records are also referable to the shield fluid level and the shield fluid pressure.

A remotely activated valve can be provided to discharge shield fluid vapor from a thermal blanket configured to intercept radiant heat energy that would otherwise pass into the product container. The remote telemetry unit has a controller to activate the remotely activated valve. Further, the control program has pre-programmed setpoints of unacceptably high vapor pressure and low liquid level within the product container and at least one subroutine activated by the control program upon at least one of the vapor pressure and liquid level reaching at least one of the setpoints. The control program also deactivate the at least one subroutine when upon each of the vapor pressure is below the unacceptably high vapor pressure and the liquid level is above the unacceptably low liquid level. The subroutine is responsive to the clock to intermittently signal the controller to activate at least the remotely activated valve to assume an open position and thereby allow shield fluid vapor to escape from the thermal blanket to be replaced by shield fluid liquid from said shield fluid tank.

The remotely activated valve can be a first remotely activated valve to discharge the shield fluid vapor from the thermal blanket. In such case, a second remotely activated valve discharges vapor of the vapor phase. The controller is configured to activate the first remotely activated valve and the second remotely activated valve. The at least one subroutine is a first subroutine to intermittently signal the controller to solely activate the first remotely activated valve and at least a second subroutine to intermittently signal the controller to activate the first remotely activated valve and the second remotely activated valve to assume the open position to respectively allow shield fluid vapor to escape from the thermal blanket to be replaced by shield fluid liquid from the shield fluid tank and the vapor of the vapor phase.

The control program can be programmed to continually store the plurality of the data records and to add additional data records thereto upon a communication failure. After a pre-programmed time interval the control program controls the remote telemetry unit to transmit the plurality of said data records and the additional data records added thereto.

The liquefied gas can be helium and the shield fluid can be nitrogen.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
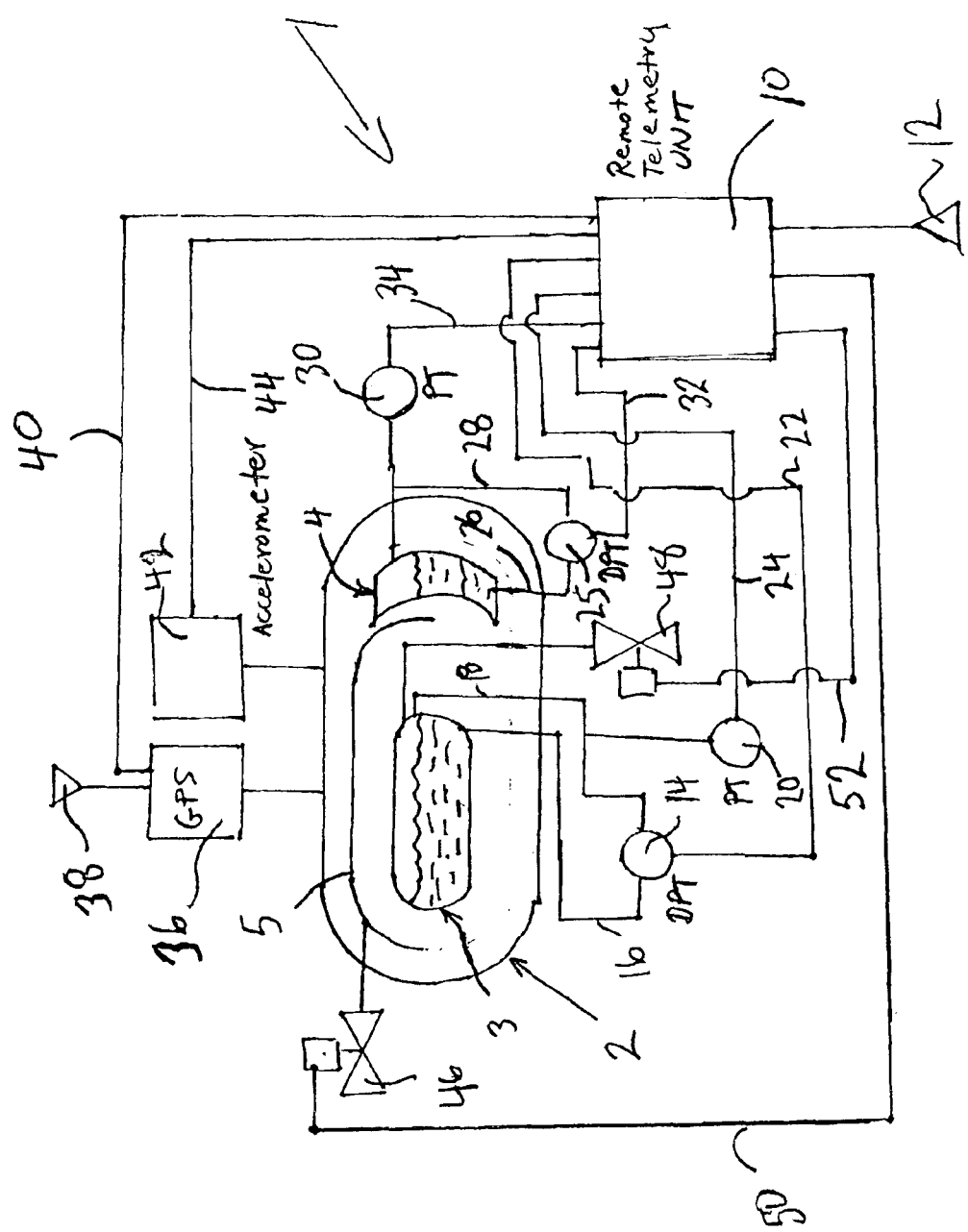
FIG. 1 is a schematic illustration of a remote monitoring system applied to a mobile storage tank contained in for instance either a tank trailer or a liquid helium container aboard ship.

With reference to FIG. 1 remote monitoring system 1 is illustrated in accordance with the present invention. Remote monitoring system 1 is used to monitor the conditions within the mobile storage tank 2 having a product container 3 that is designed to transport helium and a shield fluid tank 4 designed to contain a cryogenic shield fluid, such as nitrogen. The nitrogen cools a thermal shield 5 located within a vacuum insulation layer surrounding the product container 3 to intercept some of the radiant heat that would otherwise pass to product container 3 and heat the helium.

As will be discussed, although the present invention is described with respect to the transportation of helium and the use of thermal shield, it has broader application to any mobile storage tank having a product container that stores a liquefied gas at cryogenic temperatures for transport.

Although not illustrated, but as well known in the art, thermal shield 5 is formed by a curved rectangular metal, heat-conductive sheet that is located above the product container 3 and attached to piping connected to the shield fluid container 4. Thermal shield 5 transversely encircles the product container 3 for an arc of about 120° C. As indicated above, other designs are possible.

Another known feature not illustrated, but also well known in the art, are the various layers of vacuum jacketed insulation. Typically, there is an outer jacket and an intermediate jacket in which cryogenic shield fluid, nitrogen in this example, flows within pipes. It is to be noted, that liquid nitrogen contained within the nitrogen thermal shield will vaporize due to such heat leakage. Certain tanks may in addition have an inner helium thermal shield in which cold helium vapor serves as an additional thermal shield.

In the illustrated embodiment, over long journeys, interception of radiant heat by the nitrogen thermal shield 5 will cause the nitrogen vapor to warm and lose its thermal shielding effectiveness. Thus, inevitably the radiant heat leakage into product container 3 increases. This causes vaporization of the helium product to be transported. In order to retard this process as much as possible, the nitrogen vapor is vented and partially replaced with liquid nitrogen within the pipes of thermal shield 5. As will be discussed, in one preferred aspect of the present invention, the venting is not a constant prior art flow produced through pre-adjustment of an associated back pressure regulator, but rather is controlled. However, even with the present invention, on very long journeys, eventually, helium vapor will have to be vented from product container 3 causing some pressure loss.

In the present invention, a conventional remote telemetry unit 10 is utilized that can be obtained from such companies as Dataqwest, Inc. of Berkley Hights, N.J., U.S.A, or Rosemount, Inc., U.S.A., a Division of Emmerson, Chanhassen, Minn., U.S.A. or Control Micro Systems, Ottawa, Canada. Remote telemetry unit 10 has input channels to receive both digital and analog data. An analog to digital converter is also provided to transform analog signals introduced into analog input channels into digital signals that can be stored as data within a digital memory provided for such purpose. A message unit is provided to read all of the data records and convert the data records into a standard message structure. A cellular telephone transmitter and receiver transmits and receives the data in the standard message format from an antenna 12 that includes a unique identification of the remote telemetry unit 10. Remote telemetry unit 10 has embedded software for input/output purposes and for the modem. Memory for storing data records and additional programming is provided. In this regard, a control program, discussed in more detail below, is written into such memory to control the activities of remote telemetry unit 10 and to activate device controllers that are also incorporated therein to signal operation of remotely activated devices. As will be discussed, the control program is designed to gather data records at preset time intervals, for instance, one hour. The data records also include the particular hour of observation.

A differential pressure transducer 14 is connected by instrument lines 16 and 18 to transmit an analog data level signal referable to the level of liquid helium contained within product container 3. A pressure transducer 20 is connected to the head space within product container 3 to transmit an analog data pressure signal referable to vapor pressure within the headspace thereof. The level signal and the pressure signal are introduced into analog input channels of remote telemetry unit 10 by conductors 22 and 24.

Similarly, a differential pressure transducer 25 is connected by instrument lines 26 and 28 to transmit an analog data level signal referable to the level of liquid nitrogen shield fluid contained within shield fluid tank 4. A pressure transducer 30 is connected to the head space within shield fluid tank 4 to transmit an analog data shield fluid pressure signal referable to vapor pressure within the headspace thereof. The level signal and the pressure signal are introduced into analog input channels of remote telemetry unit 10 by conductors 32 and 34.

The above mentioned level and pressure signals are converted into data that is stored as data records within the memory of remote telemetry unit 10. It is understood that the analog to digital conversion could take place locally with respect to the differential pressure transducers 14 and 25 and pressure transducers 20 and 30 to create digital signals that could be fed into digital input channels of remote telemetry unit 10.

In addition to the foregoing, a global positioning system 36 is connected to mobile storage tank 2 to produce global position data in global latitude and longitude from signals emitted from artificial, earth-orbiting satellites in a conventional manner. In this regard, global positioning system 36 can be a board, chip set, or system obtained from Trimble of Sunnyvale, Calif., U.S.A. The global position data is introduced into a digital input channel of remote telemetry unit 10 by way of a conductor 40. The global position data is also stored as data within the data records to be recorded by remote telemetry unit 10.

An additional input may be provided by an accelerometer 42 which may be a chip set or sensor obtained from a variety of sources such as MicroStrain, Inc., of Burlington, Vt., U.S.A. Accelerometer 42 is connected to mobile storage tank 2 and produces signals referable to changes in motion of mobile storage tank 2 in three orthogonal planes. These are analog signals and are introduced into an analog input channel of remote telemetry unit 10 by way of a conductor 44. The analog acceleration signals are converted in the analog to digital converter contained within remote telemetry unit 10 to digital signals which are stored as data within the data records of the memory thereof. It is to be noted that such signals emanating from accelerometer 43 could be digital signals depending upon the unit.

The present invention, in its most basic aspect, encompasses a system of monitoring a mobile storage tank in which data records of pressure and liquid level in a product container thereof and a shield fluid container, if present, are read and stored within a remote telemetry unit along with global position data and possibly acceleration data. Access to such data records can be from broadcasts at preset time intervals or by access from a receiving station that contacts the remote telemetry unit. In fact, with cryogenic storage tanks, it is known to access data records by such methods. This is not a particularly preferred method of accessing data in that the mobile storage tank 2 may be in a location in which it is not accessible by cellular communications. Moreover, such data access requires the system to be in a state in which it is constantly drawing sufficient power to enable it to be contacted. This is not particularly desirable given the fact that only on-board battery power can be provided.

Furthermore, if it solely a matter of monitoring the state of the product within the mobile storage container, then as in the prior art, the venting of the product and shield fluid vapor must be preset. If conditions are discovered in which the setting must be changed, then such monitoring will allow a change in setting provided, however, that the mobile storage tank itself is accessible. This access may not be possible during rail or oceanic transport.

Thus, in a preferred embodiment of the present invention the control system of remote telemetry unit 10 is programmed by a control program to provide for automated communication in which data is periodically gathered and the data records are transmitted at a preset time interval. In the event that cell phone communication is not possible, data is retained and communication is attempted again after the elapse of a specific time interval. Moreover, upon upset, that is upon readings of unacceptably high vapor pressure or high or low liquid level within product container 3, remote telemetry unit 10 is also programmed through its controller to operate remotely operated valve 46 to vent shield fluid vapor from the thermal shield 5 to replace some of the vapor with shield fluid liquid from shield fluid tank 4 and if necessary to vent product vapor from product container 3 by operation of remotely activated valve 48. In this regard, remotely activated valves 46 and 48 are connected to the controller incorporated into remote telemetry unit 10 by way of conductor 50 and 52, respectively. As will be discussed, remotely activated valves 46 and 48 operate in accordance with a subroutine of the control programming of remote telemetry unit 10 which is activated upon either or both of the aforesaid upset conditions being reached within product container 3. The subroutines themselves can be located on read only memories attached to expansion slots provided for such purposes in remote telemetry unit 10 or can be further instructions within the control programming software thereof.

As will be discussed, three subroutines are provided that are preselected based upon the predicted shipment time for mobile storage container 2. The upset conditions of liquid level and vapor pressure within product container 3 are preset based upon the planned shipment mode and time or length of the trip to the use point. The selection and presetting of the subroutines and the presetting of liquid level and pressure upset conditions is remotely accomplished by an operator establishing cellular communication with remote telemetry unit 10 and sending the appropriate commands from a central application program by cellular modem. Such application programming is well known to those skilled in the art and is routinely effectuated for use with such modems. Such application programs contain a communications protocol specific to the particular modem, a decoder to decode a message string containing the data records being transmitted to and from the modem and suitable instructions for displaying and storing the data records. If during transit, the upset conditions occur, the preselected program is automatically activated to in turn signal remotely operated valves 46 and 48 to open in accordance with the pre-programmed instructions of the selected subroutine. If in fact conditions within product container 3 do not improve, it is possible for the operator to activate other subroutines in the same manner as such subroutines were initially preset.

Examples of the subroutine programs are set forth below in the following table as Program A, am B, and Program C.

| PROGRAM A | | PROGRAM B | | | PROGRAM C | | |
|---|---|---|---|---|---|---|---|
| Hour | Valve 46 | Hour | Valve 46 | Valve 48 | Hour | Valve 46 | Valve 48 |
| 1 | Open | 1 | Open | Open | 1 | Open | Open |
| 2 | Closed | 2 | Closed | Closed | 2 | Closed | Closed |
| 3 | Closed | 3 | Closed | Closed | 3 | Closed | Closed |
| 4 | Closed | 4 | Closed | Closed | 4 | Closed | Closed |
| 5 | Closed | 5 | Closed | Closed | 5 | Closed | Closed |
| 6 | Closed | 6 | Open | Closed | 6 | Closed | Closed |
| 7 | Closed | 7 | Closed | Closed | 7 | Closed | Closed |
| 8 | Closed | 8 | Closed | Closed | 8 | Closed | Closed |
| 9 | Open | 9 | Closed | Closed | 9 | Closed | Closed |
| 10 | Closed | 10 | Closed | Closed | 10 | Closed | Closed |
| 11 | Closed | 11 | Open | Closed | 11 | Closed | Closed |
| 12 | Closed | 12 | Closed | Closed | 12 | Closed | Closed |
| 13 | Closed | 13 | Closed | Closed | 13 | Closed | Closed |
| 14 | Closed | 14 | Closed | Open | 14 | Open | Closed |
| 15 | Closed | 15 | Closed | Closed | 15 | Closed | Closed |
| 16 | Closed | 16 | Open | Closed | 16 | Closed | Closed |
| 17 | Open | 17 | Closed | Closed | 17 | Closed | Closed |
| 18 | Closed | 18 | Closed | Closed | 18 | Closed | Closed |
| 19 | Closed | 19 | Closed | Closed | 19 | Closed | Closed |
| 20 | Closed | 20 | Closed | Closed | 20 | Closed | Closed |
| 21 | Closed | 21 | Open | Closed | 21 | Closed | Closed |
| 22 | Closed | 22 | Closed | Closed | 22 | Closed | Closed |
| 23 | Closed | 23 | Closed | Closed | 23 | Closed | Closed |
| 24 | Closed | 24 | Closed | Closed | 24 | Closed | Closed |

Program A is designed for an elapsed shipment time of anywhere from 1 to 5 days, use by a customer of the mobile storage tank 2 for seven days, and a return trip of 2 days. As indicated, it is only remotely operated valve 46 that is opened in hour 1, hour 9, and hour 17. The amount of time that remotely operated valve 46 is in the open position will be sufficient for about half of the nitrogen shield gas within thermal shield 5 to be replaced with nitrogen shield liquid. Program B is more aggressive than Program A in that it contemplates product venting through remotely operated valve 48 and a greater degree of activation of remotely operated valve 46. Program B might be remotely activated if conditions do not improve within product container 3 after activation of Program A. Program B could also be initially activated in that it is designed for shipment times of international scale of anywhere from between about 10 and about 30 days. Program C contemplates an international shipment where the customer is being delivered gas without any appreciable liquid.

As may be appreciated, it possible to construct embodiments of the present invention in which only one subroutine is present, such as Program A or two subroutines are present such as Program A and Program B.

Figure 2:
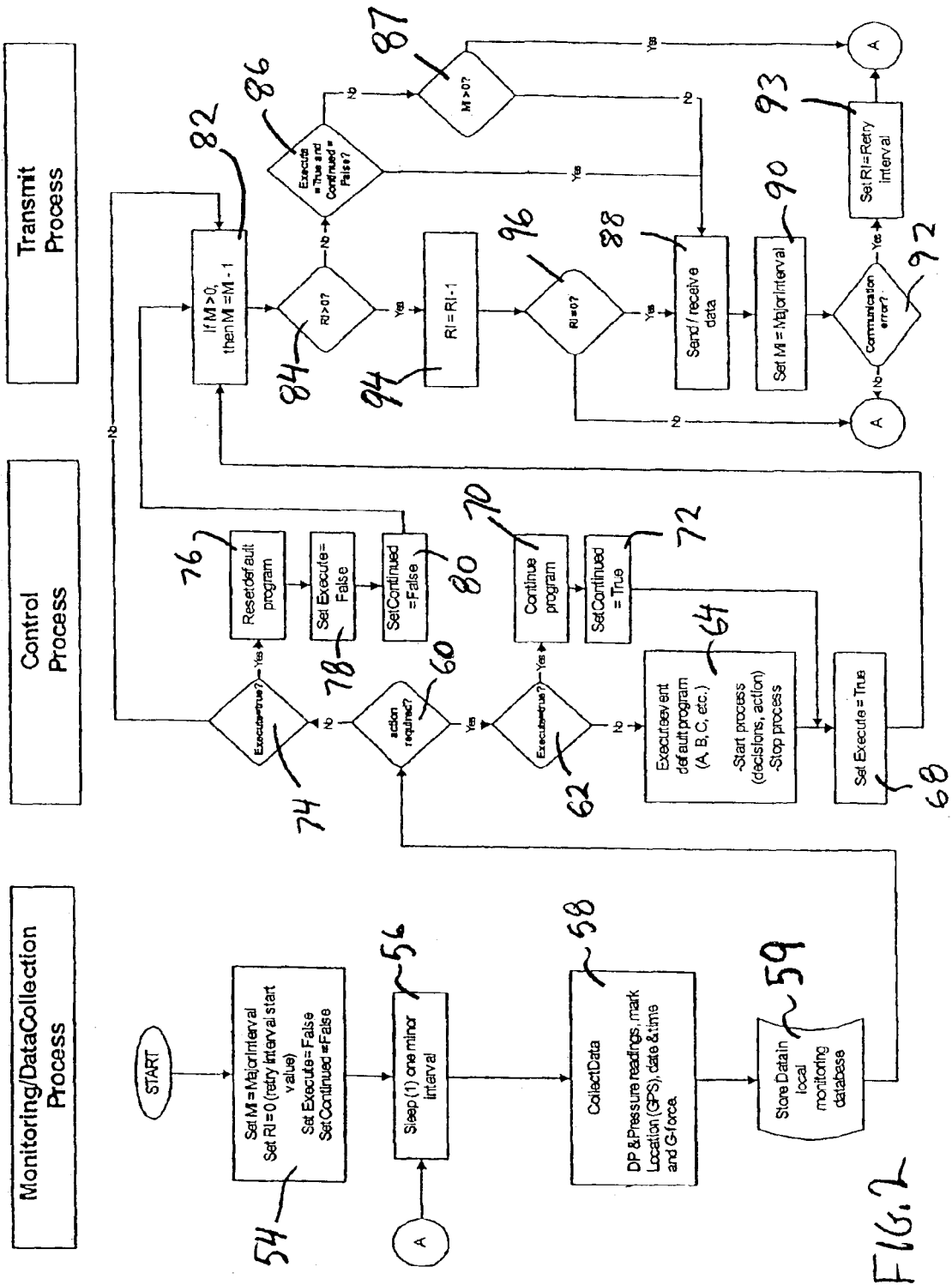
FIG. 2 illustrates a logic control diagram of the programming incorporated into the remote telemetry unit.

With reference to FIG. 2, the programming logic is illustrated for the control program for remote telemetry unit 10. As illustrated, it has three major sections, namely a "Monitoring/Data Collection Process", a "Control Process" and a "Transmit Process".

Beginning at the "Monitoring/Data Collection Process", the program is initiated with preset variables as indicated at 54. As an example, the major interval would be set at 24, the retry interval would be set at 0, the execute and continued variables would be set at "False". A counter is initiated as indicated at 56 and after an elapse of one hour, data is collected as shown at 58 by activating differential pressure transducer 14 and 25 and pressure transducers 20 and 30 are activated along with global positioning system 36 and accelerometer 42. Data records regarding liquid level, pressure, acceleration, latitude and longitude and the particular time interval of observation are all stored in local monitoring database as shown at 59.

Turning next to the "Control Process", pressure and level data is tested against upset pressure and level presets as described above and as indicated in block 60. If action is required, it is first determined in block 62 whether any subroutine has been activated by testing whether the execute variable has been reset to "True". If not reset and hence, equals "False", then the relevant subroutine is executed as shown at 64 and the execute variable is set at "True" as shown at 68. The program, from the "Transmit Process", will eventually loop back to block 56. Assuming that action is still required at block 60, the execute variable will then equal "True" as tested at 62. At this point, the program will continue as shown by block 70 and the continued variable will be set to "True" as shown in block 72. Assuming on a subsequent program loop, the test in block 60 indicates that the liquid level and pressure are above the upset variables, and hence no action is required, since the execute variable has previously been set at "True", as tested at 74, the default program (Programs A, B, and C, described above) are reset, or in other words deactivated, at 76, and variables execute and continue are both set to "False" at 78 and 80, respectively. On the next loop back to block 56, if no action is required and the execute variable has been reset to "False", the program will proceed directly to the "Transmit Process" logic.

As indicated if the major interval variable, "MI" is greater than 0, it is counted down by one time interval at 82. If the retry interval, "RI" is equal to 0, as tested at 84, the execute and continued variables are then tested at 86. If execute is equal to "True" and continued is equal to "False", then a first indication exists of upset liquid level and/or pressure and the cell phone modem is immediately activated at 88 to send and receive data. If the MI variable is equal to zero, 24 hours have elapsed, and the cell phone modem is activated at 88 to transmit the data records that have accrued in the past 24 hours. Assuming such transmission has been completed, the MI variable is reset to 24 and assuming that the communication has been successfully completed, no communication error, as shown at 92, the program loops back to block 56.

In block 86, assuming that the default programs have been executed at 64 and the continued variable has been set to "True" or the execute and continued variables are both "False" because no upset has occurred, then assuming the current value of MI is greater than zero (24 hours has not been reached) as tested at 87, the program loops back to block 56.

Assuming that a communication error has occurred at 92, the RI variable is reset at an integer at 93, for instance 8, so that communication will next be attempted after 8 hours. On the next pass of the program since RI is greater than 0 as tested as 84, RI is decreased by one as shown at 94. If after the subtraction at 94 RI does not equal 0 as tested at 96, the program loops back to block 56. When RI has counted down 8 hours and therefore equals 0, communication is then attempted again at 88.

While the present invention has been described with reference to preferred embodiment, as will occur to those skilled in the art, numerous changes, additions and omissions may be made without departing from the spirit and scope of the invention.

We claim:

1. A remote monitoring system for a mobile storage tank having a product container for storing a liquefied gas at cryogenic temperatures, said remote monitoring system comprising:

a sensor system to generate level signals referable to a liquid level of a liquid phase of said liquefied gas and pressure signals referable to vapor pressure of a vapor phase of said liquefied gas within said product container;

a global positioning system connected to said mobile storage tank to generate global position signals referable to a global position of said mobile storage tank in global latitude and longitude coordinates; and a remote telemetry unit on board said mobile storage tank and responsive to said level signals, pressure signals and global position signals to store data records containing data referable to the liquid level and vapor pressure within said product container and the global latitude and longitude coordinates and to effect a wireless transmission of said data records and a unique remote telemetry unit identification in a standard message structure.

2. The remote monitoring system of claim 1, wherein:

said remote telemetry unit has a control program programmed to periodically activate said sensor system and said global positioning system and to store a plurality of said data records at predetermined time intervals and to effect said wireless transmission of said plurality of said data records after the storage thereof is complete; and each of said data records contains time data indicative of a particular time interval in which said remote telemetry unit, said global positioning unit and said sensor system were activated.

3. The remote monitoring system of claim 2, further comprising:

an accelerometer to generate acceleration signals referable to a change in motion of said mobile storage tank;

said remote telemetry unit is response to said acceleration signals; and said data records also comprise acceleration data referable to the change in motion of said mobile storage tank.

4. The remote monitoring system of claim 3, wherein:

said level signals, said pressure signals, and said acceleration signals are analog signals and said global position signals are in a digital format; and said remote telemetry unit further has an analog to digital converter to convert said level signals, said pressure signals, and said acceleration signals to the level data, the pressure data and the acceleration data.

5. The remote monitoring system of claim 2, further comprising:

said mobile storage tank further having a cryogenic shield fluid contained within a shield fluid tank;

said sensor system being a first sensor unit;

a second sensor system to generate shield fluid level and shield fluid pressure signals referable to a cryogenic shield fluid liquid level and a shield fluid vapor pressure of said cryogenic shield fluid within said shield fluid tank; and said remote telemetry unit is also responsive to said shield fluid level and shield fluid pressure signals and said data within said data records are also referable to the shield fluid level and the shield fluid pressure.

6. The remote monitoring system of claim 5, further comprising:

a remotely activated valve to respectively discharge shield fluid vapor from a thermal blanket configured to intercept radiant heat energy otherwise passing into said product container;

said remote telemetry unit having a controller to activate said remotely activated valve; and said control program having pre-programmed setpoints of unacceptably high vapor pressure and low liquid level within said product container and at least one subroutine activated by the control program upon at least one of the vapor pressure and liquid level reaching at least one of the setpoints and deactivated by the control program when upon each of the vapor pressure being below the unacceptably high vapor pressure and the liquid level being above the unacceptably low liquid level;

the subroutine being responsive to the clock to intermittently signal said controller to activate at least said remotely activated valve to assume an open position and thereby allow shield fluid vapor to escape from said thermal blanket to be replaced by shield fluid liquid from said shield fluid tank.

7. The remote monitoring system of claim 6, wherein:

said remotely activated valve is a first remotely activated valve to discharge said shield fluid vapor from the thermal blanket;

a second remotely activated valve discharges vapor of said vapor phase;

the controller is configured to activate said first remotely activated valve and said second remotely activated valve; and said at least one subroutine is a first subroutine to intermittently signal said controller to solely activate said first remotely activated valve and at least a second subroutine to intermittently signal said controller to activate said first remotely activated valve and said second remotely activated valve to assume said open position to respectively allow shield fluid vapor to escape from said thermal blanket to be replaced by shield fluid liquid from said shield fluid tank and said vapor of the vapor phase.

8. The remote monitoring system of claim 6 or claim 7, wherein:

said control program is programmed to continually store said plurality of said data records and to add additional of said data records thereto upon a communication failure and after a pre-programmed time interval to transmit said plurality of said data records and said addition data records added thereto.

9. The remote monitoring system of claim 8, further comprising:

an accelerometer to generate acceleration signals referable to a change in motion of said mobile storage tank;

said remote telemetry unit is response to said acceleration signals; and said data records also comprise acceleration data referable to the change in motion of said mobile storage tank.

10. The remote monitoring system of claim 9, wherein:

said level signals, said pressure signals, and said acceleration signals are analog signals and said global position signals are in a digital format; and said remote telemetry unit further has an analog to digital converter to convert said level signals, said pressure signals, and said acceleration signals to the level data, the pressure data and the acceleration data.

11. The remote monitoring system of claim 10 wherein said liquefied gas is helium and said shield fluid is nitrogen.

* * * * *